United States Patent
Kindo et al.

(10) Patent No.: US 8,014,884 B2
(45) Date of Patent: Sep. 6, 2011

(54) AUDIO CONVERSATION APPARATUS

(75) Inventors: Tsuyoshi Kindo, Osaka (JP); Noboru Katta, Kanagawa (JP); Takashi Akita, Osaka (JP)

(73) Assignee: Panasonic Corporation, Osaka (JP)

( * ) Notice: Subject to any disclaimer, the term of this patent is extended or adjusted under 35 U.S.C. 154(b) by 1098 days.

(21) Appl. No.: 11/794,191

(22) PCT Filed: Nov. 22, 2005

(86) PCT No.: PCT/JP2005/021414
§ 371 (c)(1),
(2), (4) Date: Jun. 26, 2007

(87) PCT Pub. No.: WO2006/080133
PCT Pub. Date: Aug. 3, 2006

(65) Prior Publication Data
US 2008/0086308 A1   Apr. 10, 2008

(30) Foreign Application Priority Data
Jan. 25, 2005   (JP) ................. 2005-017303

(51) Int. Cl.
*G06F 17/00* (2006.01)

(52) U.S. Cl. ........................... 700/94; 715/716; 715/717
(58) Field of Classification Search .................. 700/94
See application file for complete search history.

(56) References Cited

U.S. PATENT DOCUMENTS

| | | | | |
|---|---|---|---|---|
| 7,116,789 | B2 * | 10/2006 | Layton et al. ................... | 381/17 |
| 7,496,191 | B1 * | 2/2009 | Crews et al. ............. | 379/220.01 |
| 2005/0078170 | A1 * | 4/2005 | Firestone et al. .......... | 348/14.08 |
| 2006/0212147 | A1 * | 9/2006 | McGrath et al. ................ | 700/94 |

FOREIGN PATENT DOCUMENTS

| | | |
|---|---|---|
| JP | 4-10743 | 1/1992 |
| JP | 4-56432 | 2/1992 |
| JP | 9-271006 | 10/1997 |
| JP | 2000-184017 | 6/2000 |
| JP | 2001-36881 | 2/2001 |
| JP | 2001-274912 | 10/2001 |
| JP | 2004-72354 | 3/2004 |
| JP | 2004-96664 | 3/2004 |
| JP | 2004-274147 | 9/2004 |
| JP | 2004-72354 | 3/2007 |

* cited by examiner

*Primary Examiner* — Curtis Kuntz
*Assistant Examiner* — Paul McCord
(74) *Attorney, Agent, or Firm* — Wenderoth, Lind & Ponack, L.L.P.

(57) ABSTRACT

An audio conversation apparatus includes an assignment section for individually assigning units of spatial information which are different from each other, either to parties-to-talk-with each belonging to one of a plurality of predetermined groups, respectively, or to the plurality of predetermined groups, respectively; and a localization section for localizing, in accordance with the units of spatial information assigned by the assignment section, audio data transmitted from outside, and one of a reproduction section connected to the audio conversation apparatus and a reproduction section included in the audio conversation apparatus outputs an audio in accordance with the audio data having been localized by the localization section.

8 Claims, 11 Drawing Sheets

| ID | ASSIGNED GROUP | NAME |
|---|---|---|
| 001 | GROUP A | PERSON 1a |
| 002 | GROUP A | PERSON 2a |
| 003 | GROUP A | PERSON 3a |
| 004 | GROUP A | PERSON 4a |
| 005 | GROUP A | PERSON 5a |
| 006 | GROUP A | PERSON 6a |
| 007 | GROUP A | PERSON 7a |
| 008 | GROUP A | PERSON 8a |
| 009 | GROUP B | PERSON 1b |
| 010 | GROUP B | PERSON 2b |
| 011 | GROUP B | PERSON 3b |
| 012 | GROUP B | PERSON 4b |
| 013 | GROUP B | PERSON 5b |
| 014 | GROUP B | PERSON 6b |
| 015 | GROUP C | PERSON 1c |
| 016 | GROUP C | PERSON 2c |
| 017 | GROUP C | PERSON 3c |

| ID OR AT LEAST ONE ASSIGNED GROUP | FIRST FLAG | SECOND FLAG | THIRD FLAG |

| ID | ASSIGNED GROUP | NAME | GROUP LOCALIZATION DIRECTION | PARTY LOCALIZATION DIRECTION |
|---|---|---|---|---|
| 001 | GROUP A | PERSON 1a | FORWARD DIRECTION | FORWARD DIRECTION |
| 002 | GROUP A | PERSON 2a | FORWARD DIRECTION | FORWARD RIGHT DIRECTION |
| 003 | GROUP A | PERSON 3a | FORWARD DIRECTION | RIGHT DIRECTION |
| 004 | GROUP A | PERSON 4a | FORWARD DIRECTION | BACKWARD RIGHT DIRECTION |
| 005 | GROUP A | PERSON 5a | FORWARD DIRECTION | BACKWARD DIRECTION |
| 006 | GROUP A | PERSON 6a | FORWARD DIRECTION | BACKWARD LEFT DIRECTION |
| 007 | GROUP A | PERSON 7a | FORWARD DIRECTION | LEFT DIRECTION |
| 008 | GROUP A | PERSON 8a | FORWARD DIRECTION | FORWARD LEFT DIRECTION |
| 009 | GROUP B | PERSON 1b | RIGHT DIRECTION | FORWARD DIRECTION |
| 010 | GROUP B | PERSON 2b | RIGHT DIRECTION | FORWARD RIGHT DIRECTION |
| 011 | GROUP B | PERSON 3b | RIGHT DIRECTION | RIGHT DIRECTION |
| 012 | GROUP B | PERSON 4b | RIGHT DIRECTION | BACKWARD RIGHT DIRECTION |
| 013 | GROUP B | PERSON 5b | RIGHT DIRECTION | BACKWARD DIRECTION |
| 014 | GROUP B | PERSON 6b | RIGHT DIRECTION | BACKWARD LEFT DIRECTION |
| 015 | GROUP C | PERSON 1c | BACKWARD DIRECTION | FORWARD DIRECTION |
| 016 | GROUP C | PERSON 2c | BACKWARD DIRECTION | RIGHT DIRECTION |
| 017 | GROUP C | PERSON 3c | BACKWARD DIRECTION | BACKWARD DIRECTION |

AUDIO CONVERSATION APPARATUS

BACKGROUND OF THE INVENTION

I. Technical Field

The present invention relates to an audio conversation apparatus, and more particularly to an audio conversation apparatus for allowing a simultaneous audio conversation among parties-to-talk-with each belonging to a predetermined group or a simultaneous audio conversation among a plurality of groups.

II. Description of the Related Art

A conventional audio conversation apparatus as described below is known. Specifically, in the conventional audio conversation apparatus, a communication section receives, through a network, at least audio of a party-to-talk-with. A party-to-talk-with identification section identifies the party-to-talk-with based on a telephone number, and further identifies a direction assigned to the party-to-talk-with having been identified among directions which are previously determined for each of parties-to-talk-with. Moreover, a sound image localization section processes a monophonic audio of the party-to-talk-with having been received by the communication section so as to generate a stereophonic audio, so that the audio of the party-to-talk-with is localized based on the identification made by the party-to-talk-with identification section so as to represent a three-dimensional acoustic field. An audio image reproduction section reproduces the audio of the party-to-talk-with represented as the stereophonic audio having been localized by the sound image localization section, so as to represent the three-dimensional acoustic field (see, for example, Japanese Laid-Open Patent Publication No. 2000-184017).

SUMMARY OF THE INVENTION

In recent years, an audio conversation apparatus having a push to talk (PTT: Push To Talk) function has been widespread mainly in North America. The audio conversation apparatus of this type allows a user to have a conversation with one or more parties when a conversation button is simply pushed. During the conversation, the audio conversation apparatus communicates audio data in accordance with the VoIP (Voice over Internet Protocol).

Further, in the PTT, a sound uttered by a user reaches, through a network, the audio conversation apparatuses held by all the parties belonging to a predetermined group. On the other hand, sounds from all the parties belonging to the predetermined group reach the audio conversation apparatus of the user. That is, the PTT-based audio conversation apparatus has a problem that it is difficult to identify a party who has uttered the sound having been just received.

However, even if the audio conversation apparatus having the PTT function incorporates the technique disclosed in the Japanese Laid-Open Patent Publication as described above, the aforementioned problem is not solved. This is because the technique disclosed in the Japanese Laid-Open Patent Publication as described above is intended for one party to one party audio conversation. In other words, the technique disclosed in the Japanese Laid-Open Patent Publication as described above is not directed to an audio conversation apparatus which allows a user to have a simultaneous audio conversation with multiple people.

Therefore, an object of the present invention is to provide an audio conversation apparatus which allows a user to easily identify, while having a simultaneous audio conversation with a plurality of parties, a party that has most recently uttered a sound.

In order to attain the object mentioned above, a first aspect of the present invention is directed to an audio conversation apparatus, and the audio conversation apparatus comprises; an assignment section for individually assigning units of spatial information which are different from each other, either to parties-to-talk-with each belonging to one of a plurality of predetermined groups, respectively, or to the plurality of predetermined groups, respectively; and a localization section for localizing, in accordance with the units of spatial information assigned by the assignment section, audio data transmitted from outside, in which one of a reproduction section connected to the audio conversation apparatus and a reproduction section included in the audio conversation apparatus outputs audio in accordance with the audio data having been localized by the localization section.

Specifically, the assignment section assigns either individual different directions or individual different distance effects to either the parties-to-talk-with each belonging to one of the plurality of predetermined groups, respectively, or to the plurality of predetermined groups, respectively.

Preferably, the audio conversation apparatus further comprises a notification section for notifying that the assignment section has changed assignment of the units of spatial information.

Preferably, the audio conversation apparatus further comprises an utterance operation section operated by a user for allowing a conversation to be started. In this case, the utterance operation section includes a plurality of buttons which are individually assigned with either the individual different directions having been localized by the localization section or the individual different distance effects having been localized by the localization section, respectively.

More preferably, when the reproduction section outputs the audio, the utterance operation section lights a button, among the plurality of buttons, which is assigned to either a party-to-talk-with, among the parties-to-talk-with, that has uttered a sound corresponding to the audio having been most recently outputted, or a group, among the plurality of predetermined groups, that has uttered a sound corresponding to the audio having been most recently outputted.

Preferably, the audio conversation apparatus further comprises a display section for displaying either the individual different directions or the individual different distance effects which have been most recently assigned, by the assignment section, to either the parties-to-talk-with each belonging to one of the plurality of predetermined groups, respectively, or to the plurality of predetermined groups, respectively.

Preferably, the assignment section changes, in accordance with an instruction from a user, a most recent assignment of either the individual different directions or the individual different distance effects to either the respective parties-to-talk-with each belonging to one of the plurality of predetermined groups, or to the respective plurality of predetermined groups, to another assignment thereof.

Further, a second aspect of the present invention is directed to a method used by an audio conversation apparatus for outputting audio data transmitted from outside, and the method comprises: an assignment step of individually assigning units of spatial information which are different from each other, either to parties-to-talk-with each belonging to one of a plurality of predetermined groups, respectively, or to the plurality of predetermined groups, respectively; a localization step of localizing, in accordance with the units of spatial information assigned in the assignment step, the audio data transmitted from outside; and an audio output step of outputting an audio in accordance with the audio data having been localized in the localization step by using one of a reproduction section connected to the audio conversation apparatus and a reproduction section included in the audio conversation apparatus.

Further, a third aspect of the present invention is directed to a computer program used in an audio conversation apparatus for outputting audio data transmitted from outside, and the computer program comprises: an assignment step of individually assigning units of spatial information which are different from each other, either to parties-to-talk-with each belonging to one of a plurality of predetermined groups, respectively, or to the plurality of predetermined groups, respectively; a localization step of localizing, in accordance with the units of spatial information assigned in the assignment step, the audio data transmitted from outside; and an audio output step of outputting an audio in accordance with the audio data having been localized in the localization step by using one of a reproduction section connected to the audio conversation apparatus and a reproduction section included in the audio conversation apparatus.

The computer program is typically stored in a storage medium.

As described above, according to each of the aspects of the present invention, the audio conversation control apparatus assigns either individual different directions or individual different distance effects to a plurality of parties or a plurality of groups, respectively, participating in a conversation thereamong so as to perform the sound image localization control based on the assignment. Thus, the user can easily identify a party that has most recently uttered a sound by using the audio conversation apparatus even when the user is having a simultaneous conversation with a plurality of parties.

These and other objects, features, aspects and advantages of the present invention will become more apparent from the following detailed description of the preset invention when taken in conjunction with the accompanying drawings.

BRIEF DESCRIPTION OF THE DRAWINGS

FIG. 8B is a second schematic diagram illustrating a specific structure of the utterance operation section 11 shown in. FIG. 1.

DETAILED DESCRIPTION OF THE INVENTION

Figure 1:
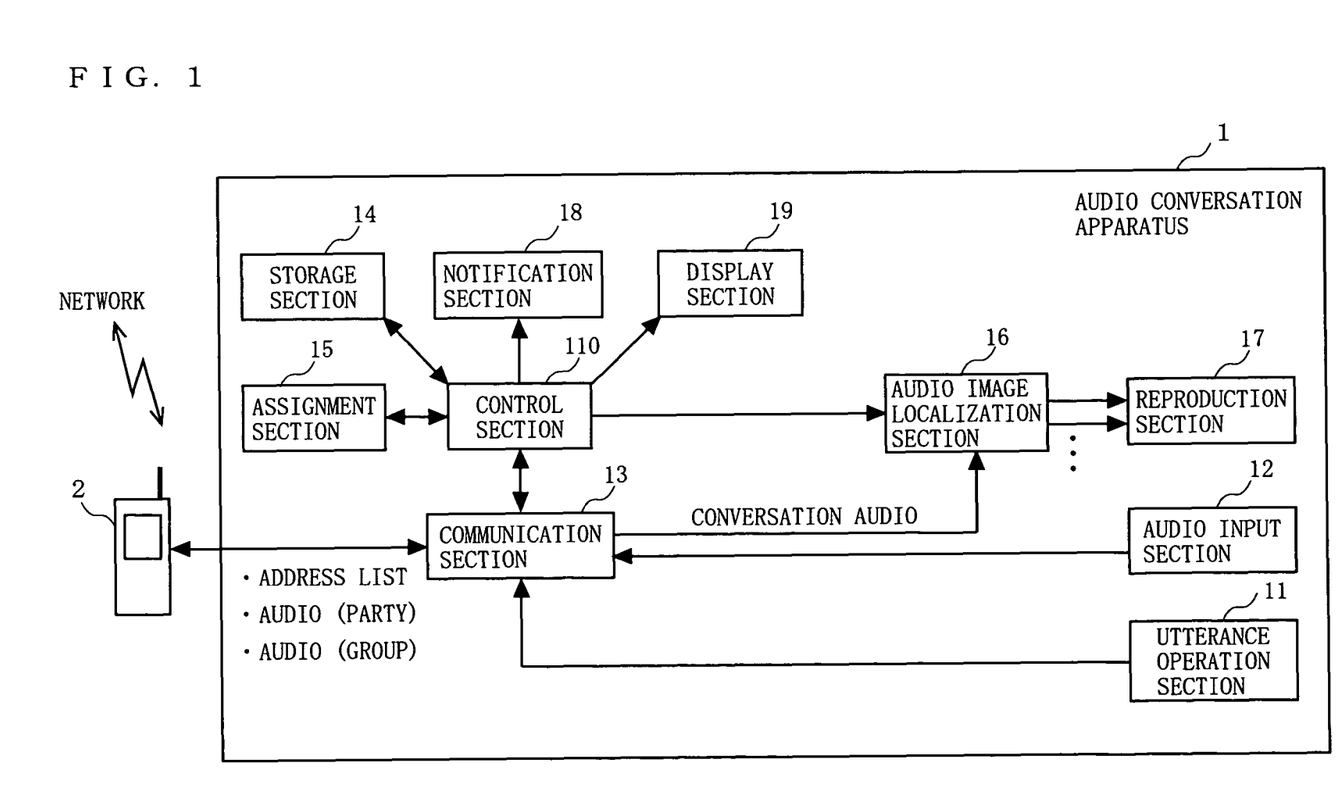
FIG. 1 is a block diagram illustrating an entire structure of an audio conversation apparatus 1 according to one embodiment of the present invention.

FIG. 1 is a block diagram illustrating an entire structure of an audio conversation apparatus 1 according to one embodiment of the present invention. In FIG. 1, the audio conversation apparatus 1 is, for example, an in-vehicle terminal apparatus connected to a handsfree mobile telephone 2. The in-vehicle terminal apparatus corresponds to, for example, a navigation apparatus which is mountable in a vehicle. The audio conversation apparatus 1 comprises: an utterance operation section 11; an audio input section 12: a communication section 13; a storage section 14; an assignment section 15; an sound image localization section 16; a reproduction section 17; a notification section 18; a display section 19; and a control section 110.

The utterance operation section 11 is typified by PTT buttons operated by a user. After a user operates the utterance operation section 11, more specifically, while the user is operating the utterance operation section 11, the user utters a sound to the audio input section 12.

To the audio input section 12, spoken words from a user of the audio conversation apparatus 1 of the present embodiment are inputted.

The communication section 13 is connectable to a network through the mobile telephone 2 such that the audio conversation apparatus 1 transmits, to the network, (transmission end) audio data generated based on the inputted sound. Further, the communication section 13 receives, through the network, (party-to-talk-with end) audio data transmitted by the audio conversation apparatuses (not shown) of parties-to-talk-with. Furthermore, the communication section 13 transmits and receives data, other than the audio data, necessary for processing. Such data includes, for example, control data (see FIG. 4). The control data represents information used for determining whether a current audio conversation is one party to one party conversation, a conversation in a group, or a conversation among a plurality of groups. The control data described above also represents information used for identifying a party that has transmitted the audio data and a group to which the party belongs. In addition thereto, the communication section 13 also receives address list data described below.

Figure 2:
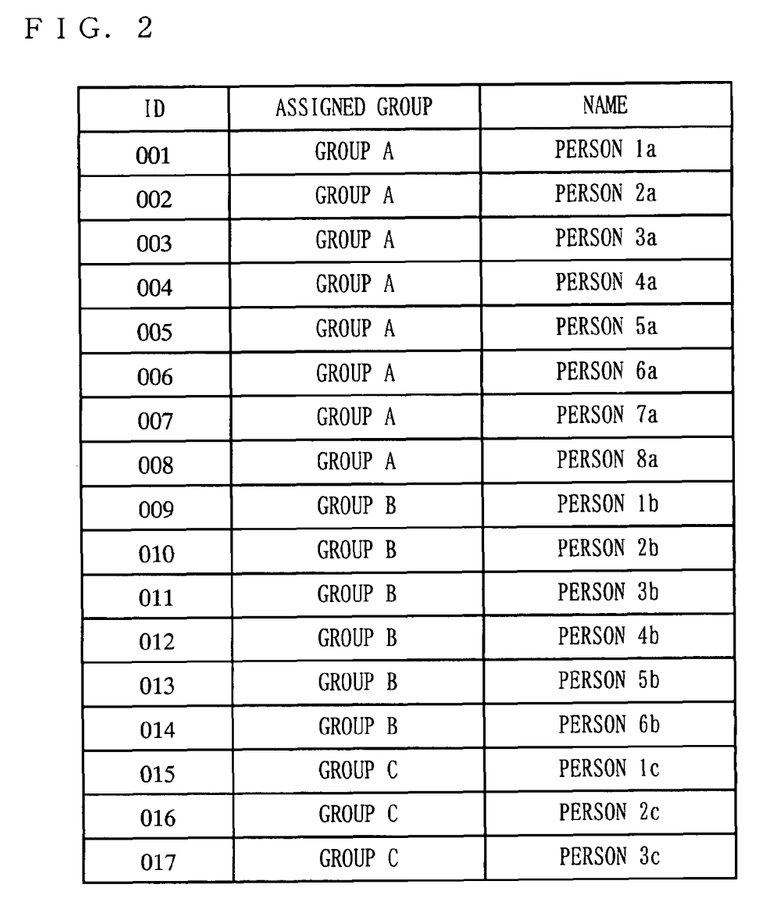
FIG. 2 is a schematic diagram illustrating a structure of address list data transmitted from a mobile telephone 2 shown in FIG. 1.

When the audio conversation apparatus 1 is connected to the network, the storage section 14, which allows data reading therefrom and data writing therein, stores the address list data which is previously stored in the mobile telephone 2. The address list data stored in the mobile telephone 2 includes some records as shown in FIG. 2. Each of the records contains at least an ID and an assigned group, and preferably contains a name in addition thereto. The address list data is edited by the audio conversation apparatus 1 as described below.

The ID, assigned to each of the audio conversation apparatuses corresponding to the parties-to-talk-with, represents information which allows the audio conversation apparatus of the party-to-talk-with to be uniquely identified. Further, the ID may be intended to be used only for the PTT or may be a telephone number.

The assigned group, to which the audio conversation apparatuses corresponding to subject parties-to-talk-with belongs, represents information which allows identification of a range in which the audio conversation apparatus 1 is able to simultaneously transmit a transmission end message.

The name typically represents information which allows identification of a user of each of the audio conversation apparatuses corresponding to subject parties-to-talk-with.

The assignment section 15 determines, in accordance with a request from the control section 110 described below, a direction in which an audio image of an audio from a party-to-talk-with and/or an audio from at least one party belonging to the assigned group is localized.

The sound image localization section 16 generates multi-channel stereo signals used for localizing the audio based on the audio data transmitted by the audio conversation apparatus of the party-to-talk-with so as to represent a three-dimensional acoustic field such that the audio can be heard coming from the direction having been determined by the assignment section 15. For example, a Head Related Transfer Function based on a sound source in a vehicle and a sound receiving point (driver seat) of the user can be used to realize the three-dimensional acoustic field localization. The transmission characteristic represented by the Head Related Transfer Function depends on a vehicle and/or a user. Therefore, it is preferable to optimize the Head Related Transfer Function depending on the user and/or an ambient environment for the user.

The reproduction section 17, corresponding to one or more speakers capable of reproducing the multi-channel stereo signals generated by the sound image localization section 16, may be a standard equipment for a vehicle, or may be dedicated to the audio conversation apparatus 1. Specifically, although FIG. 1 shows that the reproduction section 17 is included in the audio conversation apparatus 1, the reproduction section 17 may not be necessarily included in the audio conversation apparatus 1.

The notification section 18 notifies a user that a direction which is assigned to a party-to-talk-with or an assigned group by the assignment section 16 is changed to another direction.

The display section 19 displays a direction which is currently assigned to a party-to-talk-with and/or an assigned group such that the user can visually confirm a current assignment state.

The control section 110, including, for example, a CPU, a ROM and a RAM, controls components of the audio conversation apparatus 1 in accordance with the computer program which is previously stored in the ROM.

Figure 3:
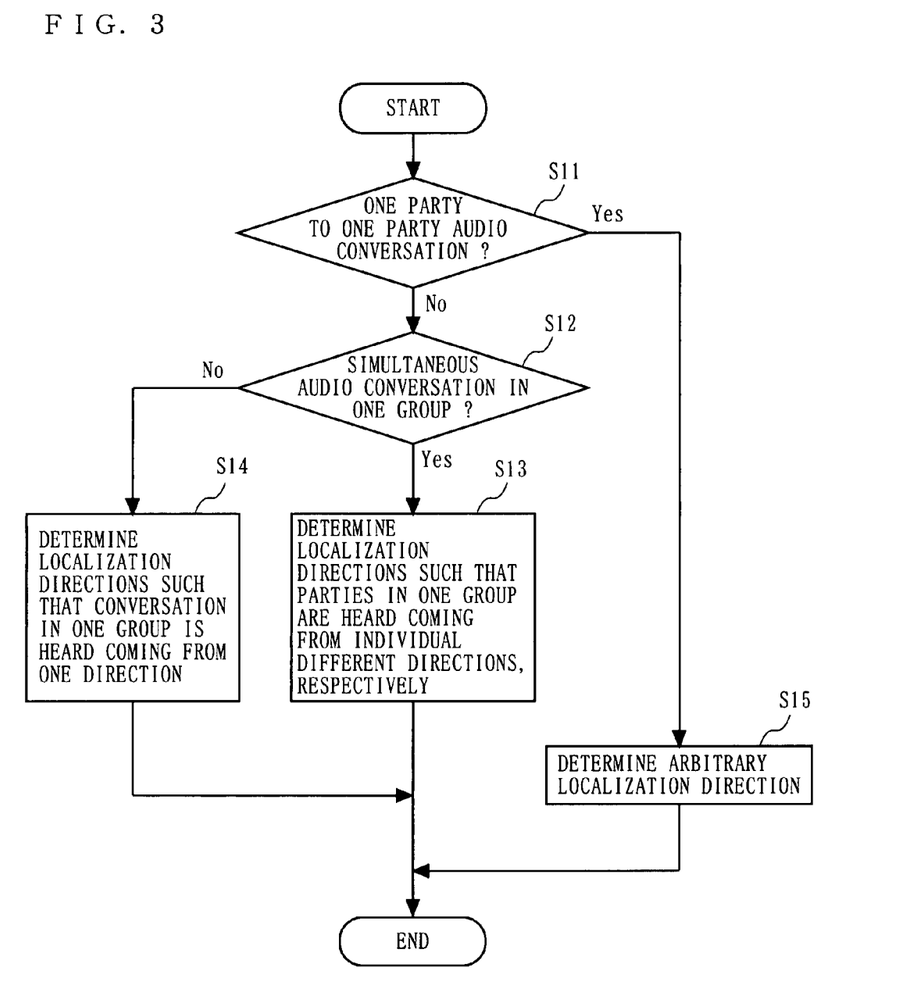
FIG. 3 is a flow chart illustrating a process performed by an assignment section 15 shown in FIG. 1.

Next, an operation performed by the audio conversation apparatus 1 according to the present embodiment will be described. FIG. 3 is a flow chart illustrating a process performed by the assignment section 15 shown in FIG. 1. The process shown in FIG. 3 is performed after a call control between the audio conversation apparatus 1 and the audio conversation apparatus of a party-to-talk-with establishes a connection therebetween.

Figure 4:
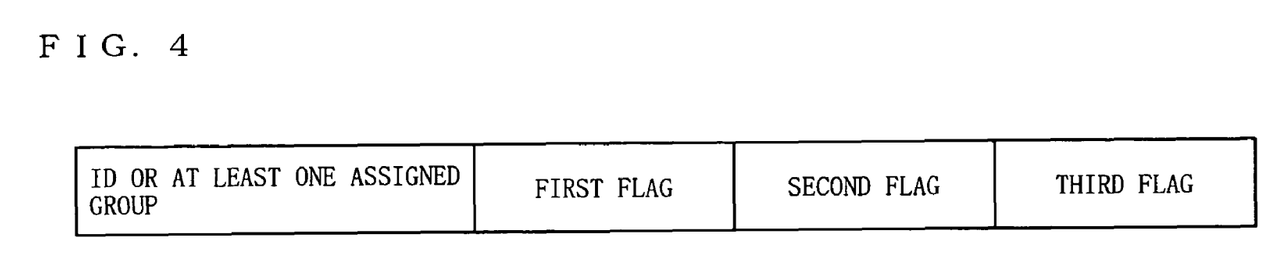
FIG. 4 is a schematic diagram illustrating a structure of control data received by the assignment section 15 shown in FIG. 1.

During or immediately after the call control as described above, the control data as shown in FIG. 4 is transmitted from the audio conversation apparatus of the party-to-talk-with. As shown in FIG. 4, the control data contains one of the ID or at least one assigned group, as well as a first to a third flags.

The ID, representing information which allows the audio conversation apparatus of the party-to-talk-with to be uniquely identified, is the same as the ID as shown in FIG. 2. The assigned group is a group involved in a current audio conversation, and is the same as the assigned group as shown in FIG. 2.

The first flag represents information indicating whether or not the current audio conversation is one party to one party conversation.

The second flag represents information indicating whether or not the current audio conversation is a conversation among all the parties each belonging to one group.

The third flag represents information indicating whether or not the current audio conversation is a conversation among all the parties of a plurality of groups.

The control data as described above may be independent data including only the ID and the first to the third flags. Further, the control data may be added to each of the audio data. The control data as described above reaches the mobile telephone 2 through the network, and is received by the communication section 13. The assignment section 15 receives, through the control section 110, the control data received by the communication section 13, thereby starting the process shown in FIG. 3.

Firstly, the assignment section 15 determines, based on the first to the third flags of the data having been most recently received, whether or not a subject audio conversation is one party to one party conversation (step S11). Specifically, whether or not the first flag is set as ON is determined. When the first flag is set as ON, each of the second and the third flags is set as OFF.

When the determination is Yes, the assignment section 15 assigns an arbitrary localization direction to the ID contained in the control data having been most recently received, and stores a current localization direction assignment state (step S15). This assignment is made because the number of the parties to talk with a user is one, and therefore the user can identify the party-to-talk-with regardless of the direction from which a sound of the party-to-talk-with is heard coming. In step S15, all the directions may be assigned as the localization direction, or a direction of the party-to-talk-with relative to the user may be determined as the localization direction when information representing a position of the party-to-talk-with relative to the user is acquired.

When the determination in step S11 is No, the assignment section 15 determines whether or not a simultaneous audio conversation in one group is to be held (step S12). Specifically, whether or not the second flag is set as ON is determined. When the second flag is set as ON, each of the first and the third flags is set as OFF.

When the determination is Yes, the assignment section 15 assigns individual different localization directions to the parties, respectively, each belonging to the assigned group corresponding to a subject group to talk with, and stores a current localization direction assignment state (step S13). This assignment allows the audios of the parties each belonging to the assigned group corresponding to the subject group to talk with to be heard coming from the individual different directions, respectively, by the user. When the total number of the localization directions is less than the number of the parties each belonging to the group corresponding to the subject group to talk with, the assignment section 15 allows some of the parties to share a common localization direction.

When the determination in step S12 is No, that is, when only the third flag is set as ON, individual different localization directions are assigned to a plurality of the assigned groups, respectively, corresponding to the subject groups to talk with, and the localization direction assignment state is stored (step S14). This assignment allows the user to hear the audio conversation in one group coming from one direction.

When the aforementioned steps S13 to S15 are ended, the assignment section 15 ends the process shown in FIG. 3. Thereafter, the audio data transmitted from the party-to-talk-with is transmitted to the sound image localization section 16 through the communication section 13. The sound image localization section 16 localizes, in accordance with the assignment made by the assignment section 15, the audio represented by the audio data having been received, and causes the reproduction section 17 to output the audio.

Figure 5:
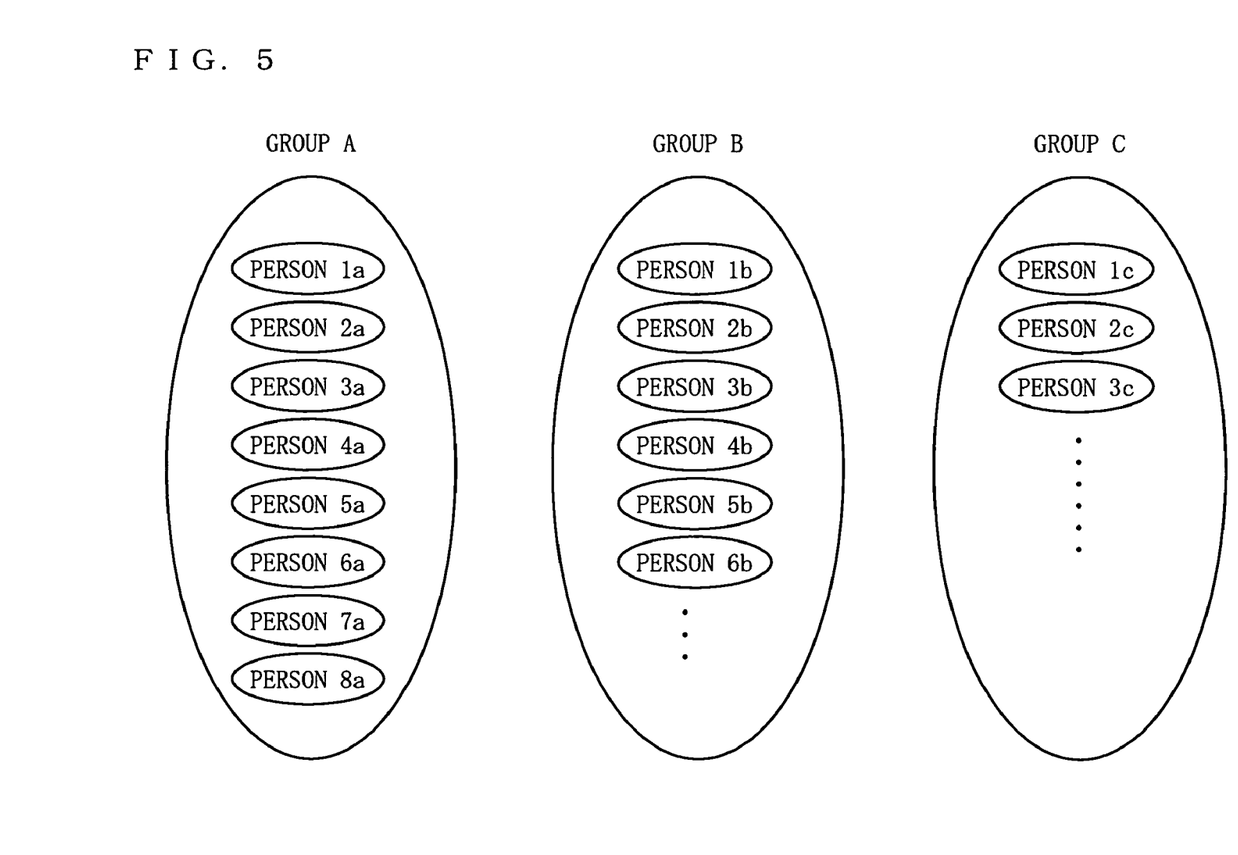
FIG. 5 is a schematic diagram illustrating exemplary group structures of groups represented by the address list data stored in the mobile telephone 2 shown in FIG. 1.

Next, with reference to FIGS. 5, 6A and 6B, a specific example of the process performed by the audio conversation apparatus 1, that is, the process up to the end of the process performed by the assignment section 15, will be described. FIG. 5 is a schematic diagram illustrating exemplary group structures represented by the address list data stored in the mobile telephone 2 shown in FIG. 1. As shown in FIG. 5, it is assumed that eight parties, 1a, 2a, 3a, 4a, 5a, 6a, 7a, and 8a, belong to group A, six parties, 1b, 2b, 3b, 4b, 5b, and 6b, belong to group B, and three parties, 1c, 2c and 3c, belong to group C.

Figure 6A:
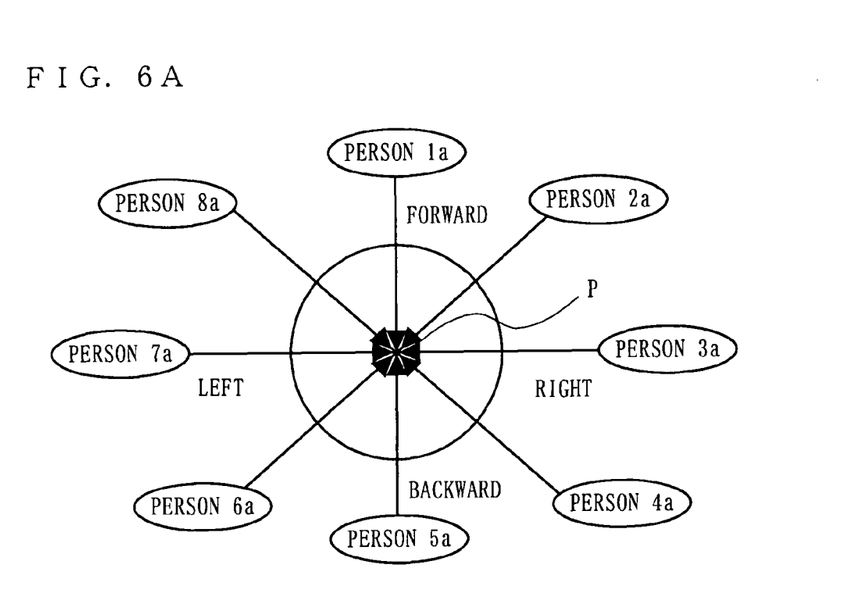
FIG. 6A is a schematic diagram illustrating an exemplary state where the localization directions are assigned when the control data in which the group name shown in FIG. 4 represents A, and the second flag is set as ON is transmitted.

Further, FIG. 6A is a schematic diagram illustrating an exemplary state where the localization directions are assigned when the control data in which the group name shown in FIG. 4 represents A, and the second flag is set as ON is transmitted.

In FIG. 6A, as viewed from a position P of the user, the forward direction, the diagonally forward right direction, the right direction, the diagonally backward right direction, the backward direction, the diagonally backward left direction, the left direction, and the diagonally forward left direction are assigned to the party-to-talk-with 1a, the party-to-talk-with 2a, the party-to-talk-with 3a, the party-to-talk-with 4a, the party-to-talk-with 5a, the party-to-talk-with 6a, the party-to-talk-with 7a, and the party-to-talk-with 8a, respectively.

Figure 7:
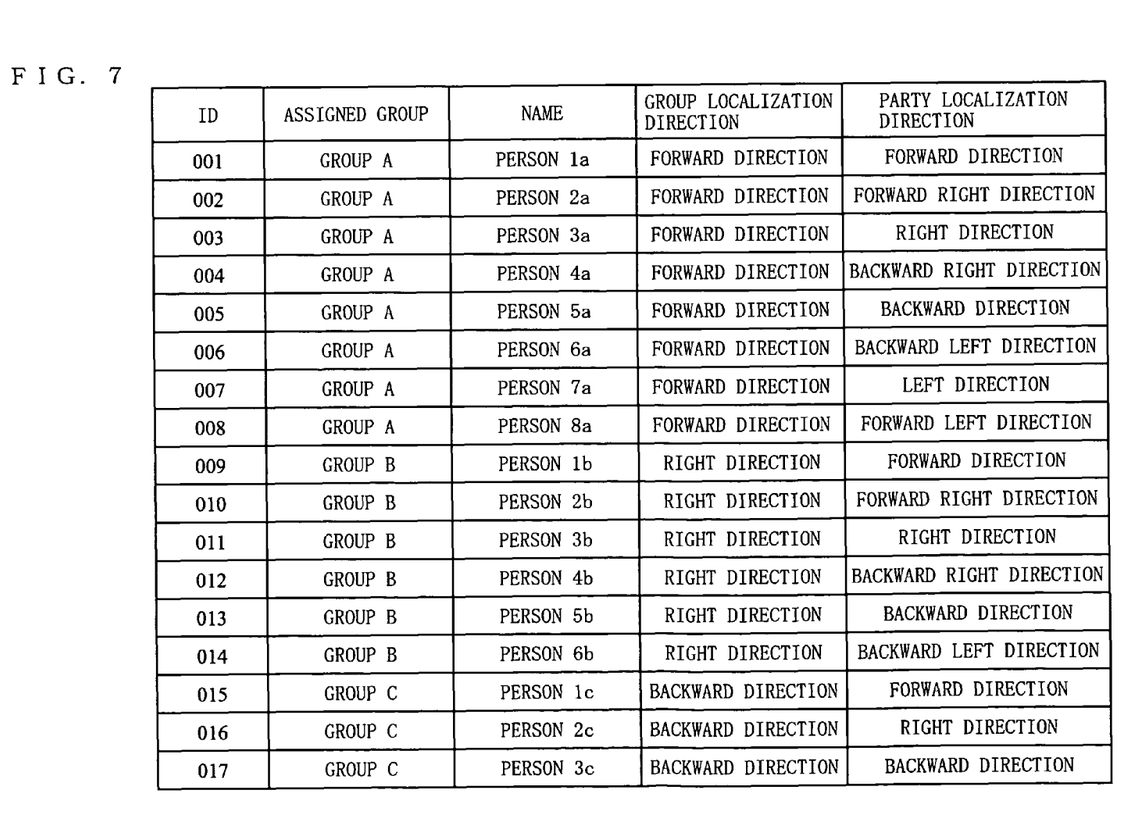
FIG. 7 is a schematic diagram illustrating examples of the localization directions assigned by the assignment section 15 shown in FIG. 1.

In this case, as shown in FIG. 7, information representing the forward direction, information representing the diagonally forward right direction, information representing the right direction, information representing the diagonally backward right direction, information representing the backward direction, information representing the diagonally backward left direction, information representing the left direction, and information representing the diagonally forward left direction are added, by the assignment section 15 using the control section 110, to the record of the party-to-talk-with 1a, the record of the party-to-talk-with 2a, the record of the party-to-talk-with 3a, the record of the party-to-talk-with 4a, the record of the party-to-talk-with 5a, the record of the party-to-talk-with 6a, the record of the party-to-talk-with 7a, and the record of the party-to-talk-with 8a, respectively, thereby updating the address list data so as to represent a current assignment state and is stored in the storage section 14.

Further, in this case, the user hears the audio of the party-to-talk-with 1a coming from the forward direction, the audio of the party-to-talk-with 2a coming from the diagonally forward right direction, the audio of the party-to-talk-with 3a coming from the right direction, the audio of the party-to-talk-with 4a coming from the diagonally backward right direction, the audio of the party-to-talk-with 5a coming from the backward direction, the audio of the party-to-talk-with 6a coming from the diagonally backward left direction, the audio of the party-to-talk-with 7a coming from the left direction, and the audio of the party-to-talk-with 8a coming from the diagonally forward left direction.

Figure 6B:
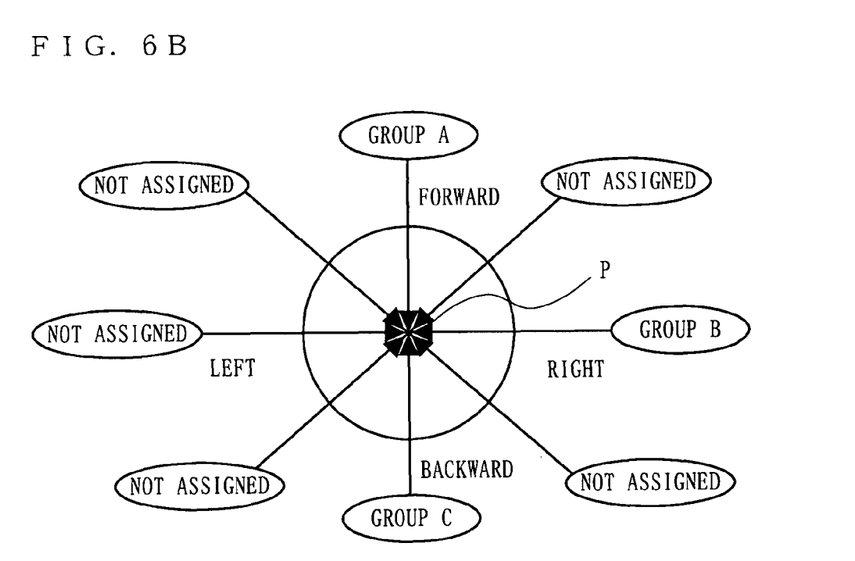
FIG. 6B is a schematic diagram illustrating an exemplary state where the localization directions are assigned when the control data in which the group names shown in FIG. 4 represent A, B, and C, and the third flag is set as ON is transmitted.

Further, FIG. 6B is a schematic diagram illustrating an exemplary state where the localization directions are assigned when the control data in which the group names shown in FIG. 4 represent A, B and C, and the third flag is set as ON is transmitted. In FIG. 6B, as viewed from the position P of the user, the forward direction, the right direction and the backward direction are assigned to group A, group B, and group C, respectively. When the number of the groups corresponding to subject groups to talk with is small, the groups are preferably assigned with the individual localization directions, respectively, as shown in FIG. 6B such that the assigned localization directions are not adjacent to each other. In this case, the user can easily identify a group from which the audio is coming. The same can be said for a case where the number of the parties-to-talk-with is small.

In the aforementioned case, as shown in FIG. 7, information representing the forward direction, information representing the right direction, and information representing the backward direction are added, by the assignment section 15 using the control section 110, to the record of the parties-to-talk-with 1a, 2a, 3a, 4a, 5a, 6a, 7a, and 8a (group A), the record of the parties-to-talk-with 1b, 2b, 3b, 4b, 5b, and 6b (group B), and the record of the parties-to-talk-with 1c, 2c, and 3c (group C), respectively, thereby updating the address list data so as to represent a current assignment state and is stored in the storage section 14.

Further, in the aforementioned case, the user can hear the audio of each of the parties belonging to group A coming from the forward direction, the audio of each of the parties belonging to group B coming from the right direction, and the audio of each of the parties belonging to group C coming from the right direction.

Figure 8A:
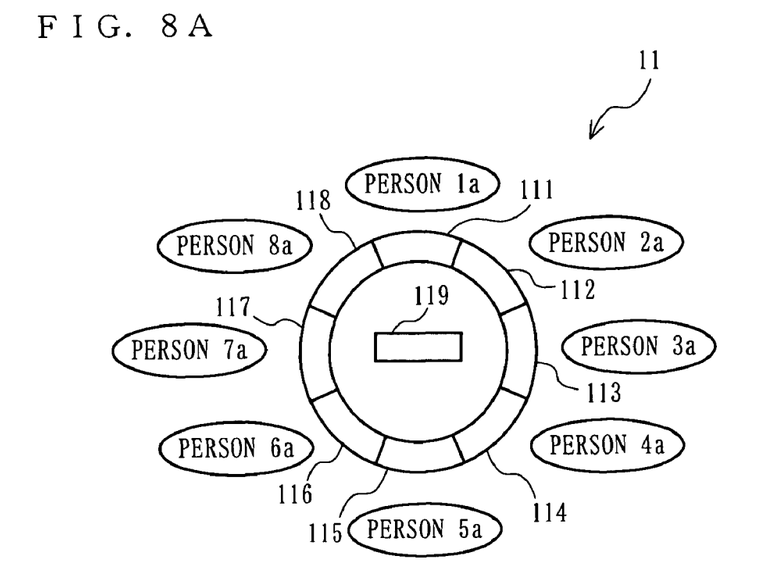
FIG. 8A is a first schematic diagram illustrating a specific structure of an utterance operation section 11 shown in FIG. 1.
Figure 8B:
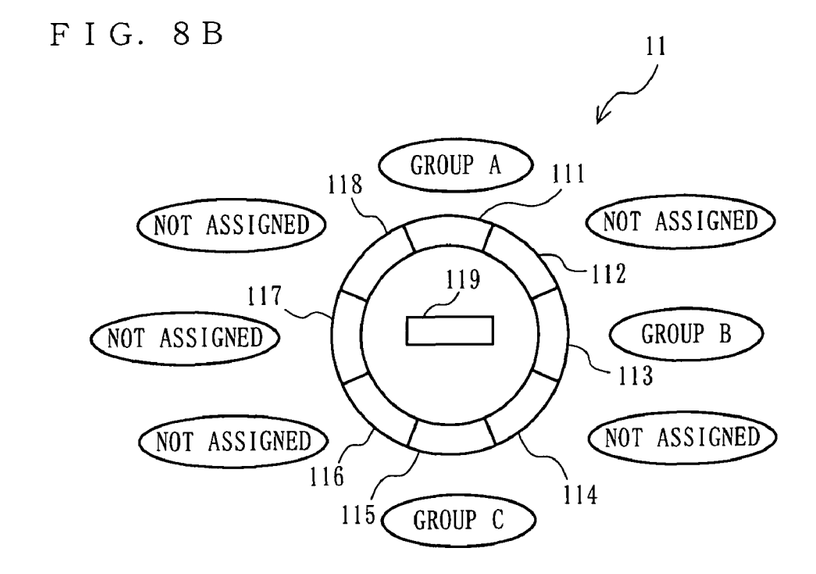

Further, as described above, in the present embodiment, the localization direction is assigned for each party-to-talk-with or for each group, and therefore the utterance operation section 11 preferably has a broadcast button 119, and PTT buttons 111 to 118 of the same number (eight in the present embodiment) as that of the localization directions, as shown in FIGS. 8A and 8B. More preferably, the PTT buttons 111 to 118 are assigned with the individual different localization directions, respectively.

Further, the PTT buttons 111 to 118 are positioned so as to form a ring shape such that each of the PTT buttons 111 to 118 represents the corresponding individual localization direction assigned thereto, thereby allowing the user to perform an intuitive operation. More specifically, the PTT button 111, the PTT button 112, the PTT button 113, the PTT button 114, the PTT button 115, the PTT button 116, the PTT button 117, and the PTT button 118 are assigned with the forward direction (or the upward direction), the diagonally forward right direction (or the diagonally upward right direction), the right direction, the diagonally backward right direction (or the diagonally downward right direction), the backward direction (or the downward direction), the diagonally backward left direction (or the diagonally downward left direction), the left direction, and the diagonally forward left direction (or the diagonally upward left direction), respectively, as viewed from the position P of the user representing the center of the ring shape formed by the PTT buttons 111 to 118.

As described above, when the localization directions are assigned as shown in FIG. 6A, the PTT button 111, the PTT button 112, the PTT button 113, the PTT button 114, the PTT button 115, the PTT button 116, the PTT button 117, and the PTT button 118 are assigned with the party-to-talk-with 1a, the party-to-talk-with 2a, the party-to-talk-with 3a, the party-to-talk-with 4a, the party-to-talk-with 5a, the party-to-talkwith 6a, the party-to-talk-with 7a, and the party-to-talk-with 8a, respectively, as shown in FIG. 8A.

Further, when the localization directions are assigned as shown in FIG. 6B, the PTT button 111, the PTT button 113, and the PTT button 115 are assigned with group A, group B, and group C, respectively, as shown in FIG. 8B.

While operating a corresponding one of the PTT buttons 111 to 118 as described above, the user inputs, to the audio input section 12, a sound to the party or the group assigned to the PTT button which is being operated.

Moreover, the broadcast button 119 is preferably included in the utterance operation section 11, and therefore a sound of the user can be transmitted, by operating the simultaneous notification button, to all the parties with which the connections are currently established, for example.

Although the PTT buttons 111 to 118 are positioned on a two-dimensional plane as described above, the present invention is not restricted thereto. The PTT buttons may be positioned on a plane of a three-dimensional shape (for example, a sphere).

As described above, the audio conversation apparatus 1 according to the present embodiment assigns individual different directions to a plurality of parties-to-talk-with or a plurality of groups to talk with, respectively, and controls the sound image localization based on the assignment. Therefore, the user can easily identify, based on a direction from which an audio is heard coming, a party whose sound is currently outputted by the audio conversation apparatus 1 even when the user is having a simultaneous conversation with a plurality of parties.

Although in the aforementioned embodiment, a direction is assigned to a party-to-talk-with or a group, the present invention is not restricted thereto. A distance effect may be assigned thereto.

Further, although in the embodiment as described above the total number of the localization directions to be assigned is eight, the number other than eight may be used. Further, the total number of the localization directions may be changed depending on a state.

Further, the localization direction may be assigned in a hierarchical manner. Specifically, the assignment of the localization directions to the respective groups as shown in FIG. 6B is made as a higher hierarchical assignment. Further, the assignment of the localization directions to the respective parties as shown in FIG. 6A is made as a lower hierarchical assignment. In this case, the user initially operates the PTT button 111 shown in FIG. 8B so as to designate group A and thereafter operates the PTT button 111 shown in FIG. 8A so as to designate the party 1a, and then the user utters a sound. In this case, a manner in which the PTT button 111 is operated is preferably changed depending on whether the operation of the PTT button 111 corresponds to a start of the conversation in group A representing a higher order of the hierarchy or a transfer to a lower order of the hierarchy, so as to determine whether the operation of the PTT button 111 represents a start of the conversation in group A or a transfer to the lower order of the hierarchy. The operation manners can be changed by utilizing a long pressing and a short pressing on the PTT button 111.

Figure 9:
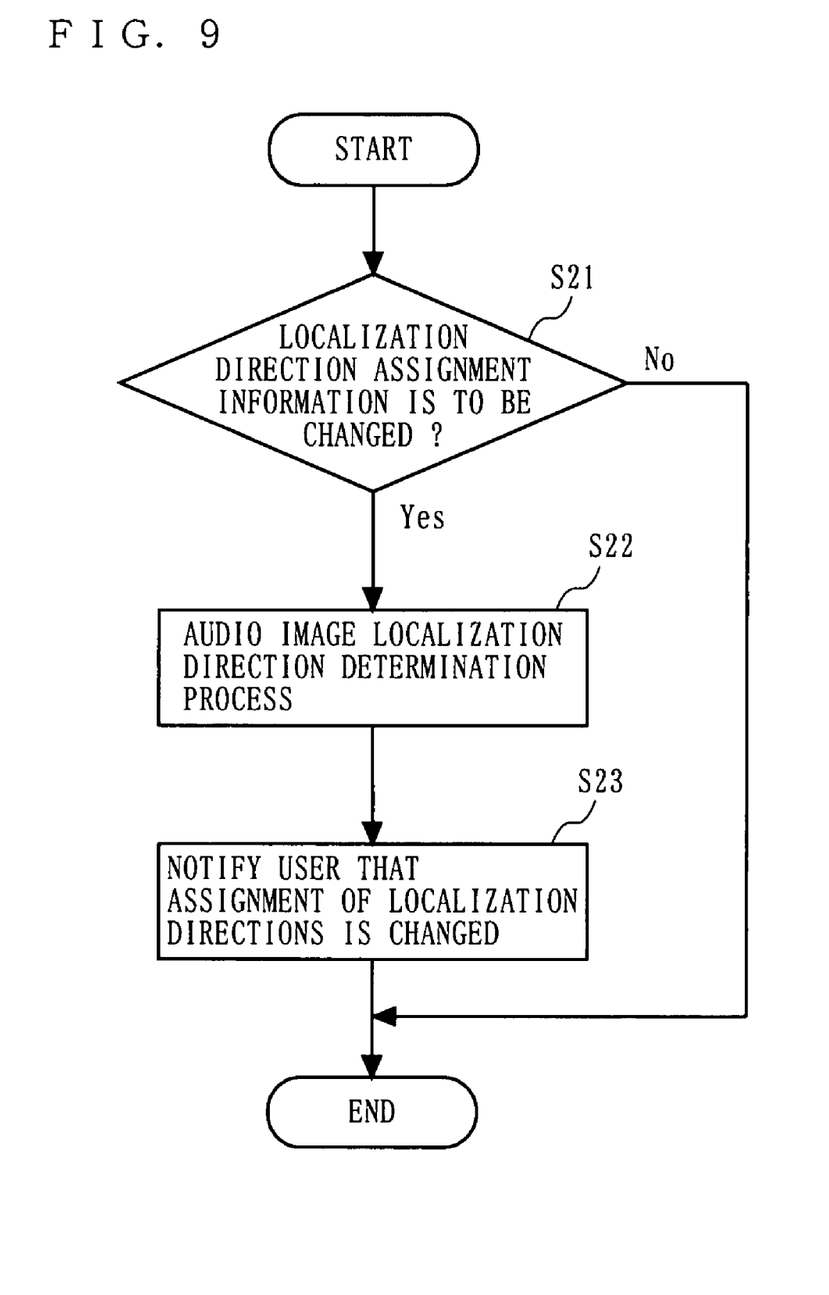
FIG. 9 is a flow chart illustrating a change notification process performed by the audio conversation apparatus 1 shown in FIG. 1.

Further, since it is difficult for a user to notice that the localization direction assignment state is changed, the audio conversation apparatus 1 preferably performs a change notification process as shown in FIG. 9. In FIG. 9, the control section 110 determines whether or not the localization direction assignment state is to be changed based on the ID or the group name and/or the flag contained in the control data shown in FIG. 4 each time the control data is received (step S21).

When the determination is No, the change notification process shown in FIG. 9 is ended. On the other hand, when the determination is Yes, the control section 110 requests the assignment section 15 to perform the process (step S22), so that the assignment section 15 starts the process shown in FIG. 3.

Further, the control section 110 requests the notification section 18 to notify the user that the localization direction assignment is changed (step S23). The notification section 18 notifies the user, in a manner which typically uses a synthesized sound or a light emission, that the localization direction assignment is changed. Thus, the user can notice that the localization direction assignment is changed.

Figure 10:
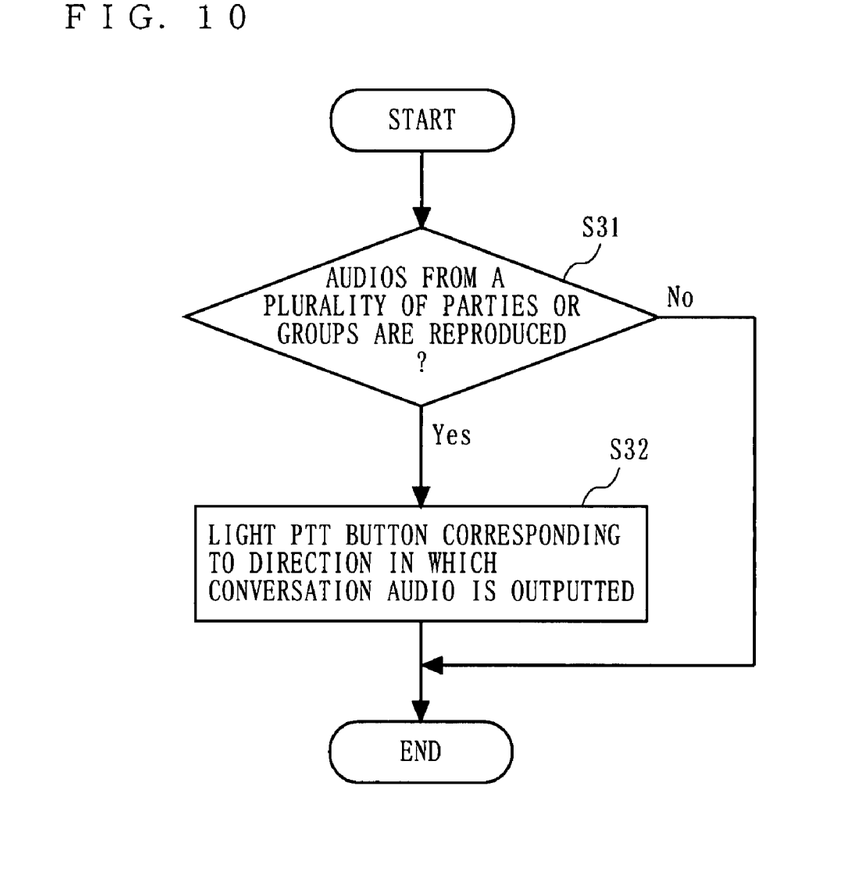
FIG. 10 is a flow chart illustrating a party-to-talk-with notification process performed by the audio conversation apparatus 1 shown in FIG. 1.

Further, it is preferable that each of the PTT buttons 111 to 118 of the utterance operation section 11 can emit light and the control section 110 performs a party-to-talk-with notification process as shown in FIG. 10 such that the user can identify the party-to-talk-with enhanced easiness. Specifically, as shown in FIG. 10, when audios of a plurality of parties or a plurality of groups are reproduced (step S31), the control section 110 lights a PTT button, among the PTT buttons 111 to 118, assigned to a party, among the plurality of parties, that has most recently uttered a sound or a group, among the plurality of groups, that has most recently uttered a sound (step S32). Therefore, when responding to a party-to-talk-with that has most recently outputted the conversation audio, the user can identify the party-to-talk-with enhanced easiness based on the direction from which the conversation audio has been outputted and a selection button having been lit. The method for identifying, among the PTT buttons 111 to 118, the subject PTT button corresponding to a party-to-talk-with is not limited to the method using the light emission from each of the PTT buttons 111 to 118, and the notification to the user may be performed in any method.

Figure 11:
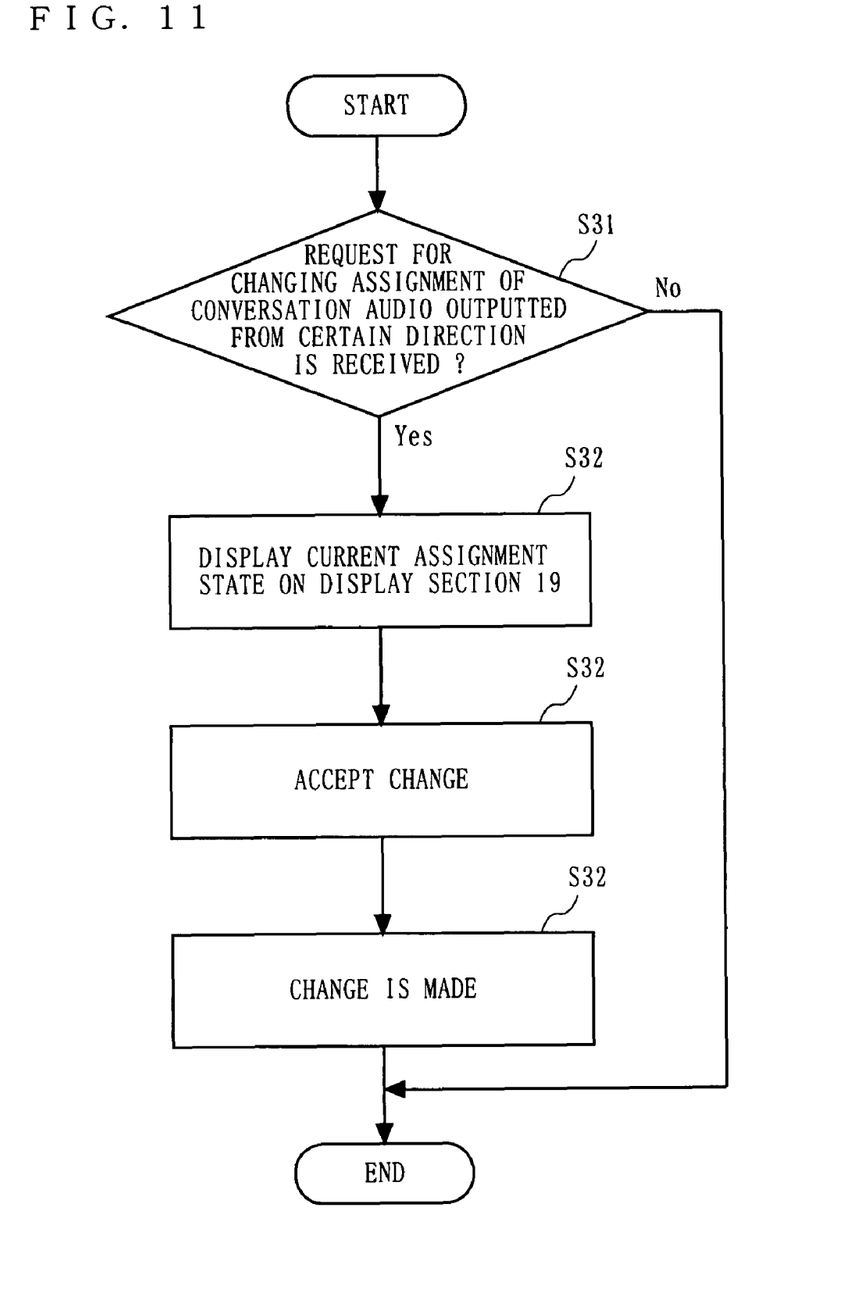
FIG. 11 is a flow chart illustrating an assignment change process performed by the audio conversation apparatus 1 shown in FIG. 1.

Further, it is preferable that the user can always identify a party-to-talk-with (a group-to-talk-with) corresponding to a direction from which an audio is heard coming, and can arbitrarily change the direction when the direction is unfavorable. The control section 110 preferably performs an assignment change process as shown in FIG. 11. Specifically, in FIG. 11, the control section 110 determines whether or not a request from a user for changing the assignment of a conversation audio outputted from a certain direction is received (step S41). This change request is outputted by an input device not shown in accordance with an operation performed by a user. A most suitable input device for the assignment change is a touch panel display.

When the determination is No, the control section 110 ends the process shown in FIG. 11. When the determination is Yes, the control section 110 requests the display section 19 to display a current localization direction assignments state. In response to the request, the display section 19 displays an image which visually represents states shown in FIGS. 6A and 6B, for example (step S42).

Next, the control section 110 accepts the localization direction assignment change in accordance with the input made by the user (step S43), and the change is made in accordance with the accepted change (step S44).

The assignment change is preferably made in response to the operation performed by a user. However, since the easy identification of the party-to-talk-with is prevented, it is not preferable that each time the audio data is received, or each time the audio conversation is held, the localization direction assignment is changed. Therefore, it is preferable that the localization directions having been already assigned are stored, and the audio conversation apparatus 1 uses the localization directions having been stored when the subsequent audio conversation is held in similar circumstances.

The control section 110 operates in accordance with the computer program which is previously stored in the ROM as described above. However, the present invention is not restricted thereto, and the process as described above may be realized using hardware. Further, the computer program stored in a storage medium such as a CD-ROM may be provided. In addition thereto, the computer program may be stored in a server apparatus connected to a network such that the audio terminal apparatus 1 is able to download the computer program.

While the present invention has been described in detail, the foregoing description is in all aspects illustrative and not restrictive. It is understood that numerous other modifications and variations can be devised without departing from the scope of the invention.

The audio conversation apparatus according to the present invention is applicable to an in-vehicle terminal apparatus and the like, and allows a user to easily identify a party that has most recently uttered a sound in a simultaneous audio conversation with a plurality of parties.

The invention claimed is:

1. An audio conversation apparatus comprising
   an assignment section for individually assigning distance effects, which are different from each other, to parties-to-talk-with, each party-to-talk-with belonging to one of a plurality of predetermined groups, or to the plurality of predetermined groups, and
   a localization section for localizing, in accordance with the distance effects assigned by said assignment section, audio data transmitted from outside by a party-to-talk-with of the parties-to-talk-with, or by a predetermined group of the predetermined groups, the audio data transmitted corresponding to a source of the audio data,
   a reproduction section for outputting audio in accordance with the audio data localized by said localization section, the audio outputted being in accordance with the distance effects assigned by said assignment section; and
   an utterance operation including a plurality of buttons arranged in unique positions corresponding to distance effects to be assigned by the assignment section, wherein
   each button of the plurality of buttons corresponds a distance effect of the distance effects of the audio outputted by the reproduction section, and is configured such that, when operated, a conversation with the party-to-talk-with of the parties-to-talk-with or the predetermined group of the predetermined groups that corresponds to the source of the audio data begins.

2. The audio conversation apparatus according to claim 1, wherein the assignment section is configured to assign, as a superordinate assignment, each distance effect of the distance effects to one group of the plurality of predetermined groups, and is further configured to assign, as a subordinate assignment, each distance effect of the distance effects to individuals in each of the plurality of predetermined groups.

3. The audio conversation apparatus according to claim 1, further comprising a notification section for notifying that the assignment section has changed assignment of the distance effects.

4. The audio conversation apparatus according to claim 1, wherein when the reproduction section outputs the audio, the utterance operation section lights a button, among the plurality of buttons, which is assigned to either one of the parties-to-talk-with, that has uttered a sound corresponding to the audio having been most recently outputted, or one of the plurality of predetermined groups, that has uttered a sound corresponding to the audio having been most recently outputted.

5. The audio conversation apparatus according to claim 1, further comprising a display section for displaying individual different distance effects which have been most recently assigned, by the assignment section, to either the parties-to-talk-with each belonging to one of the plurality of predetermined groups, or to the plurality of predetermined groups.

6. The audio conversation apparatus according to claim 1, wherein the assignment section changes, in accordance with an instruction from a user, a most recent assignment individual different distance effects to either the respective parties-to-talk-with each belonging to one of the plurality of predetermined groups, or to the prospective plurality of predetermined groups, to another assignment thereof.

7. A method used by an audio conversation apparatus for outputting audio data transmitted from outside, said method comprising
   individually assigning distance effects which are different from each other, to parties-to-talk-with each party-to-talk-with belonging to one of a plurality of predetermined groups or to the plurality of predetermined groups,
   localizing, in accordance with distance effects assigned in said assigning, audio data transmitted from outside by a party-to-talk-with of the parties-to-talk-with or by a predetermined group of the predetermined groups, the audio data transmitted corresponding to a source of the audio data,
   outputting audio in accordance with the audio data localized by said localizing, the outputted audio being in accordance with the distance effects assigned in said assigning; and,
   enabling utterance operation by allowing a user to operate one of a plurality of buttons, the plurality of buttons being arranged in unique positions corresponding to the distance effects to be assigned in said assigning, the one of the plurality of buttons corresponding to a distance effect of the distance effect in which the audio outputted in said outputting is heard, said enabling utterance operation further includes identifying the party-to-talk-with or the predetermined group with whom a conversation is to begin, and starting the conversation with the party-to-talk-with or the predetermined group that corresponds to the source of the audio data.

8. A non-transitory computer readable storage device storing a computer program used in an audio conversation apparatus for outputting audio data transmitted from outside, said computer program executing
   individually assigning distances which are different from each other, to parties-to-talk-with each party-to-talk-with belonging to one of a plurality of predetermined groups, respectively, or to the plurality of predetermined groups,
   localizing, in accordance with the distances assigned in said assigning, the audio data transmitted from outside by a party-to-talk-with of the parties-to-talk-with or to a predetermined group of the predetermined groups, the audio data localized corresponding to a source of the audio data, outputting audio in accordance with the audio data localized by said localizing, the outputted audio being in accordance with the distance effects assigned in said assigning; and, enabling utterance operation by allowing a user to operate one of a plurality of buttons, the plurality of buttons being arranged in unique positions corresponding to the distance effects to be assigned in said assigning, the one of the plurality of buttons corresponding to a distance effect of the distance effects in which the audio outputted in said outputting is heard, said enabling utterance operation further includes identifying the party-to-talk-with or the predetermined group with whom a conversation is to begin, and starting the conversation with the party-to-talk-with or the predetermined group that corresponds to the source of the audio data.

* * * * *